(12) United States Patent
Fujimori

(10) Patent No.: US 10,289,374 B2
(45) Date of Patent: May 14, 2019

(54) DISPLAY SYSTEM, DISPLAY APPARATUS, CONTROL APPARATUS, AND CONTROL METHOD

(71) Applicant: Seiko Epson Corporation, Tokyo (JP)

(72) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 15/411,465

(22) Filed: Jan. 20, 2017

(65) Prior Publication Data

US 2017/0212719 A1 Jul. 27, 2017

(30) Foreign Application Priority Data

Jan. 26, 2016 (JP) .................................. 2016-012073

(51) Int. Cl.
| | |
|---|---|
| *G06F 3/14* | (2006.01) |
| *H04N 9/31* | (2006.01) |
| *H04N 21/41* | (2011.01) |
| *H04W 84/12* | (2009.01) |

(52) U.S. Cl.
CPC ......... *G06F 3/1454* (2013.01); *H04N 9/3147* (2013.01); *H04N 21/4122* (2013.01); *G09G 2356/00* (2013.01); *G09G 2370/042* (2013.01); *G09G 2370/22* (2013.01); *H04W 84/12* (2013.01)

(58) Field of Classification Search
CPC .............................. G06F 3/1454; H04W 84/12
See application file for complete search history.

(56) References Cited

U.S. PATENT DOCUMENTS

| | | | |
|---|---|---|---|
| 2004/0222983 A1 | 11/2004 | Kakemura | |
| 2006/0077120 A1* | 4/2006 | Domi | G06F 3/0488 |
| | | | 345/2.3 |
| 2007/0046495 A1 | 3/2007 | Kumagai | |
| 2007/0106950 A1* | 5/2007 | Hutchinson | G09B 5/067 |
| | | | 715/761 |

(Continued)

FOREIGN PATENT DOCUMENTS

| | | |
|---|---|---|
| JP | 2004-259089 A | 9/2004 |
| JP | 2004-264769 A | 9/2004 |
| JP | 2005-346558 A | 12/2005 |

(Continued)

*Primary Examiner* — Charles V Hicks
(74) *Attorney, Agent, or Firm* — ALG Intellectual Property, LLC

(57) ABSTRACT

A display system includes an information processing apparatus and a projector, in which the information processing apparatus includes a display unit, a communication unit, and a PC control unit that causes the display unit to display information regarding the projector with which communication is performed via the communication unit. The projector includes a communication unit, a remote control light receiving unit, and a PJ control unit that transmits an operation detection command via the communication unit in a case where the operation is received by the remote control light receiving unit. In a case where the operation detection command is received via the communication unit, the PC control unit changes an appearance of information regarding the projector having transmitted the operation detection command among information pieces displayed by the display unit.

14 Claims, 12 Drawing Sheets

(56) References Cited

U.S. PATENT DOCUMENTS

2007/0195008 A1\* 8/2007 Ueno .................... G06F 3/1454
345/1.1

FOREIGN PATENT DOCUMENTS

| | | |
|---|---|---|
| JP | 2007-60399 A | 3/2007 |
| JP | 2008-304837 A | 12/2008 |
| JP | 2013-219471 A | 10/2013 |

\* cited by examiner

PL

| CHECK | IP ADDRESS |
|---|---|
| ☐ | 192. 168. 0. 100 |
| ☐ | 192. 168. 0. 101 |
| ☐ | 192. 168. 0. 102 |
| ☐ | 192. 168. 0. 103 |
| ☐ | 192. 168. 0. 104 |
| ☐ | 192. 168. 0. 105 |

FIG. 5

| CHECK | IP ADDRESS |
|---|---|
| ☐ | 192. 168. 0. 100 |
| ☐ | 192. 168. 0. 101 |
| ☐ | 192. 168. 0. 102 |
| ☐ | 192. 168. 0. 103 |
| ☐ | 192. 168. 0. 104 |
| ☐ | 192. 168. 0. 105 |

DISPLAY SYSTEM, DISPLAY APPARATUS, CONTROL APPARATUS, AND CONTROL METHOD

The entire disclosure of Japanese Patent Application No. 2016-012073, filed Jan. 26, 2016 is expressly incorporated by reference herein.

BACKGROUND

1. Technical Field

The present invention relates to a display system, a display apparatus, a control apparatus, and a control method.

2. Related Art

As a display system provided with a display apparatus, there is a so-called multi-projection system which displays an image by using a plurality of projectors. For example, JP-A-2013-219471 discloses a display system which treats projectors present in the same room as the same group on the basis of group information which is acquired from each projector via a communication network, and causes projectors in the same group to display an image.

Meanwhile, in a case of a large-scale display system in which a plurality of projectors are disposed to be distributed to a plurality of rooms, the projectors are required to be grouped for each room.

However, in the configuration of the related art, projectors present in the same room cannot be easily specified before storing group information. Thus, the time and effort for grouping work are required. Particularly, in a case of business use, a layout of projectors may be changed by moving a projector, and it is hard to quickly cope with this layout change.

SUMMARY

An advantage of some aspects of the invention is to be able to easily specify display apparatuses which are disposed to be distributed to a plurality of rooms, for each room.

An aspect of the invention is directed to a display system including a control apparatus; and a display apparatus, in which the control apparatus includes a display unit; a first communication unit; and a first control unit that causes the display unit to display information regarding the display apparatus with which communication is performed via the first communication unit, in which the display apparatus includes a second communication unit; an operation reception unit that receives an operation; and a second control unit that transmits operation detection information via the second communication unit in a case where the operation is received by the operation reception unit, the operation detection information indicates that the operation has been detected, and in which, in a case where the operation detection information is received via the first communication unit, the first control unit changes an appearance of the information regarding the display apparatus having transmitted the operation detection information among information pieces displayed by the display unit.

According to the aspect of the invention, the control apparatus changes an appearance of information regarding a display apparatus having received an operation, and thus it is possible to easily specify a display apparatus within a range of receiving an operation (for example, a predetermined room inside).

Another aspect of the invention is directed to the configuration described above, in which the first control unit transmits search information for searching for the display apparatus via the first communication unit; in a case where the search information is received via the second communication unit, the second control unit transmits response information which is a response to the search information via the second communication unit; and the first control unit receives the response information via the first communication unit, and causes the display unit to display information indicating the display apparatus having transmitted the response information in a list form.

According to the aspect of the invention, it is possible to display information indicating display apparatuses having transmitted response information in a list form.

Another aspect of the invention is directed to the configuration described above, in which in a case where the operation detection information is received via the first communication unit, the first control unit changes an appearance of the information indicating the display apparatus having transmitted the operation detection information to an appearance of being discriminable from information indicating other display apparatuses.

According to the aspect of the invention, it is possible to easily specify information indicating a display apparatus having transmitted operation detection information.

Another aspect of the invention is directed to the configuration described above, in which in a case where the operation detection information is received via the first communication unit, the first control unit causes the display unit to display the information indicating the display apparatus having transmitted the operation detection information in an appearance of being visually recognized prior to information indicating other display apparatuses.

According to the aspect of the invention, information indicating a display apparatus having transmitted operation detection information is preferentially visually recognized, and thus the display apparatus can be easily specified.

Another aspect of the invention is directed to the configuration described above, in which in a case where the operation detection information is received via the first communication unit, the first control unit causes the display unit to display the information indicating the display apparatus having transmitted the operation detection information in an emphasized manner among information pieces displayed in a list form.

According to the aspect of the invention, it is possible to preferentially visually recognize information indicating a display apparatus having transmitted operation detection information through emphasis display.

Another aspect of the invention is directed to the configuration described above, in which in a case where the operation detection information is received via the first communication unit, the first control unit causes the display unit to display the information indicating the display apparatus having transmitted the operation detection information at an upper position among information pieces displayed in a list form.

According to the aspect of the invention, it is possible to preferentially visually recognize information indicating a display apparatus having transmitted operation detection information through a sorting process.

Another aspect of the invention is directed to the configuration described above, in which in a case where the operation detection information is received via the first communication unit, the first control unit deletes information indicating display apparatuses other than the display apparatus having transmitted the operation detection information among information pieces displayed by the display unit in a list form.

According to the aspect of the invention, since information indicating display apparatuses other than a display apparatus having transmitted operation detection information is deleted, it is possible to more easily specify information indicating the display apparatus having transmitted the operation detection information.

Another aspect of the invention is directed to the configuration described above, in which in a case where the second control unit can perform a process corresponding to an operation received by the operation reception unit, and receives the search information via the second communication unit, the second control unit transitions to a restriction mode for restricting execution of a process corresponding to an operation received by the operation reception unit, and transmits the operation detection information via the second communication unit in a case where a predetermined operation is received by the operation reception unit in the restriction mode.

According to the aspect of the invention, in a case where search information is received, transition to a restriction mode for restricting execution of a process corresponding to an operation received by the operation reception unit occurs, and thus it is possible to restrict an operation on a display apparatus.

Another aspect of the invention is directed to a display system including a first display apparatus; and a second display apparatus, in which the first display apparatus includes a display unit; a first communication unit; and a first control unit that causes the display unit to display information regarding the second display apparatus with which communication is performed via the first communication unit, in which the second display apparatus includes a second communication unit; an operation reception unit that receives an operation; and a second control unit that transmits operation detection information via the second communication unit in a case where the operation is received by the operation reception unit, the operation detection information indicates that the operation has been detected, and, in which, in a case where the operation detection information is received via the first communication unit, the first control unit changes an appearance of the information regarding the second display apparatus having transmitted the operation detection information among information pieces displayed by the display unit.

According to the aspect of the invention, the first display apparatus changes an appearance of information regarding the second display apparatus having received an operation, and thus it is possible to easily specify a display apparatus within a range of receiving an operation (for example, a predetermined room inside).

Another aspect of the invention is directed to a display apparatus including a display unit; a communication unit that performs communication with a control apparatus; an operation reception unit that receives an operation; and a control unit that transmits response information which is a response to search information via the communication unit in a case where the search information for searching for the display apparatus, transmitted from the control apparatus, is received via the communication unit, and transmits via the communication unit in a case where the operation is received by the operation reception unit after the search information is received via the communication unit, the operation detection information indicates that the operation has been detected.

According to the aspect of the invention, the display apparatus transmits response information in a case where search information transmitted from the control apparatus is received, and transmits operation detection information in a case where an operation is received by the operation reception unit after the search information is received. Consequently, it is possible to easily specify the display apparatus on the control apparatus side.

Another aspect of the invention is directed to the configuration described above, in which in a case where the control unit can perform a process corresponding to an operation received by the operation reception unit, and receives the search information via the communication unit, the control unit transitions to a restriction mode for restricting execution of a process corresponding to an operation received by the operation reception unit, and transmits the operation detection information via the communication unit in a case where a predetermined operation is received by the operation reception unit in the restriction mode.

According to the aspect of the invention, it is possible to easily specify the display apparatus on the control apparatus side while restricting an operation on the display apparatus.

Another aspect of the invention is directed to a control apparatus including a display unit; a communication unit that performs communication with a display apparatus; and a control unit that causes the display unit to display information regarding a display apparatus with which communication is performed via the communication unit, in which, in a case where search information for searching for the display apparatus is transmitted via the communication unit, and response information which is a response to the search information, transmitted from the display apparatus having received the search information, is received via the communication unit, the control unit causes the display unit to display information indicating the display apparatus having transmitted the response information in a list form, and, in which, in a case where operation detection information indicating that an operation has been detected, transmitted from the display apparatus, is received via the communication unit, the control unit changes an appearance of information regarding the display apparatus having transmitted the operation detection information among information pieces displayed by the display unit.

According to the aspect of the invention, it is possible to easily specify information regarding a display apparatus having transmitted operation detection information.

The display system, the display apparatus, and the control apparatus according to the aspects of the invention are applicable to control methods for a display system, a display apparatus, and a control apparatus. The control methods may be applied to programs which are realized by using computers included in a display system, a display apparatus, and a control apparatus. These programs may be realized in an aspect of a recording medium recording the programs in a computer readable manner, or an aspect of a transmission medium transmitting the programs. As the recording medium, a magnetic recording medium, an optical recording medium, or a semiconductor memory device may be used. Specifically, as the recording medium, a portable recording medium such as a flexible disc, a compact disk read only memory (CD-ROM), a digital versatile disk (DVD), a Blu-ray (registered trademark) disc, a magnetooptical disc, a flash memory, or a card type recording medium, or a fixed type recording medium may be used. The recording medium may be an internal storage device provided in a printing apparatus, for example, a random access memory (RAM), or a nonvolatile memory such as a read only memory (ROM) or a hard disk drive (HDD).

BRIEF DESCRIPTION OF THE DRAWINGS

The invention will be described with reference to the accompanying drawings, wherein like numbers reference like elements.

FIG. 5 is a diagram illustrating an example of a projector list.

FIG. 9 is a diagram illustrating another display example of a projector list.

DESCRIPTION OF EXEMPLARY EMBODIMENTS

Hereinafter, embodiments of the invention will be described with reference to the drawings.

First Embodiment

Figure 1:
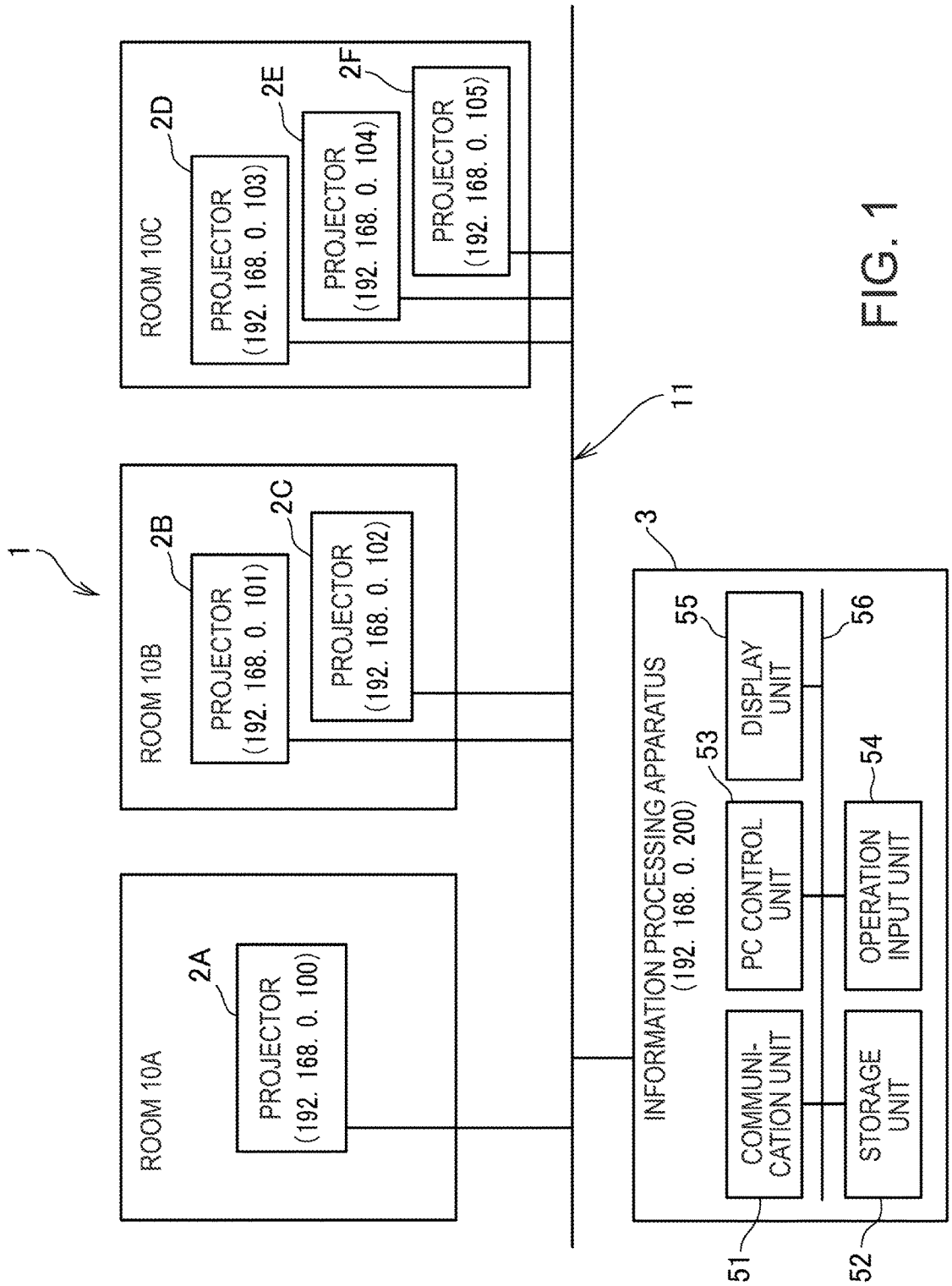
FIG. 1 is a diagram illustrating a schematic configuration of a display system according to a first embodiment of the invention.

FIG. 1 is a diagram illustrating a schematic configuration of a display system 1 according to a first embodiment of the invention.

The display system 1 includes a plurality of projectors 2A to 2F provided in a plurality of rooms 10A, 10B and 10C; and an information processing apparatus 3 (control apparatus) which is communicably connected to the plurality of projectors 2A to 2F via a communication network 11. The display system 1 is configured by communicably connecting the projectors 2A to 2F provided in the plurality of rooms 10A, 10B and 10C to the information processing apparatus 3 provided in any one of the rooms 10A, 10B and 10C or a separate room, for example, by using the communication network 11 built in a single building. The communication network 11 is a network conforming to a well-known local area network (LAN) standard, and may be a wired LAN or a wireless LAN.

An Internet Protocol (IP) address is allocated to each apparatus (the projectors 2A to 2F, and the information processing apparatus 3) connected to the communication network 11. The IP address is identification information for identifying an apparatus which performs transmission and reception.

FIG. 1 also illustrates IP addresses of the projectors 2A to 2F. For example, an IP address of the projector 2A is "192.168.0.100", an IP address of the projector 2B is "192.168.0.101", and an IP address of the projector 2C is "192.168.0.102". An IP address of the projector 2D is "192.168.0.103", an IP address of the projector 2E is "192.168.0.104", and an IP address of the projector 2F is "192.168.0.105". An IP address of "192.168.0.200" is set in the information processing apparatus 3. These IP addresses may be automatically set by a network management apparatus (not illustrated), and may be manually set by a network administrator or the like.

As illustrated in FIG. 1, the single projector 2A is disposed in the room 10A, the two projectors 2B and 2C are disposed in the room 10B, and the three projectors 2D to 2F are disposed in the room 10C. Hereinafter, in a case where the projectors 2A to 2F are not required to be particularly differentiated from each other, the projectors 2A to 2F are indicated by the projectors 2 or the projector 2. In a case where the rooms 10A, 10B and 10C are not required to be particularly differentiated from each other, the rooms 10A, 10B and 10C are indicated by the rooms 10 or the room 10.

The projector 2 functions as a display apparatus which displays an image on a screen SC (FIG. 2) installed in the room 10 in which the projector 2 is disposed. These projectors 2 may be used as a single projector, and may be used as multi-projectors. The single projector is a projector which displays a projection image with a single projector 2. The multi-projectors are projectors which combine projection images 101 and 102 (FIG. 2) from a plurality of projectors 2 so as to display a single projection image 100.

In the present embodiment, the projector 2A in the room 10A is used as a single projector. On the other hand, a plurality of projectors 2 are disposed in the rooms 10B and 10C, and thus it is possible to build a multi-projection system which displays the single projection image 100 by using images from a plurality of projectors 2 for each of the rooms 10B and 10C.

If the multi-projection system is to be built, it is necessary that each projector 2 satisfies predetermined installation conditions, and a plurality of projectors 2 disposed in the same room 10 are treated as the same group, and appropriate image data is supplied to each projector 2.

The information processing apparatus 3 is an apparatus having a calculation processing function, such as a personal computer (PC), and functions as a control apparatus which performs a process of grouping the projectors 2 for each room 10. The information processing apparatus 3 functions as an image supply apparatus which distributes and supplies image data to the respective projectors 2 via the communication network 11 on the basis of grouping results. The information processing apparatus 3 may supply data regarding images and voices to each projector 2.

Figure 2:
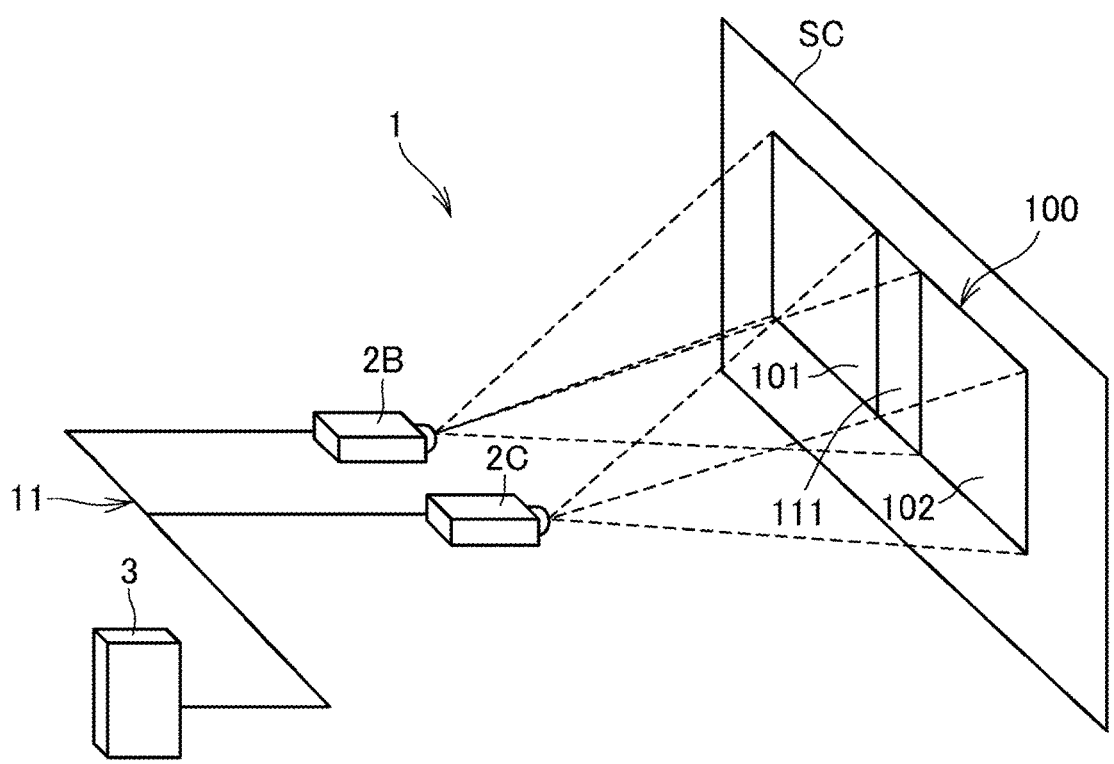
FIG. 2 is a diagram illustrating a case of configuring a multi-projection system.

FIG. 2 is a diagram illustrating a case where a multi-projection system is formed by using the projectors 2B and 2C in the room 10B.

As illustrated in FIG. 2, the projector 2B projects an image onto a left portion in the screen SC (projection surface), the projector 2C projects an image onto a right portion in the screen SC, and thus the single projection image 100 is projected. Ranges in which the respective projectors 2B and 2C project images onto the screen SC are determined depending on a distance between the screen SC and each of the projectors 2B and 2C, a gap between the adjacent projectors 2B and 2C, and angles of optical axes of the projectors 2B and 2C with respect to the screen SC.

The example illustrated in FIG. 2 shows a case where the projection image 101 from the projector 2B and the projection image 102 from the projector 2C have an overlapping region 111 in which mutual edges overlap each other, so that a boundary due to tiling is not visible on the screen SC.

Figure 3:
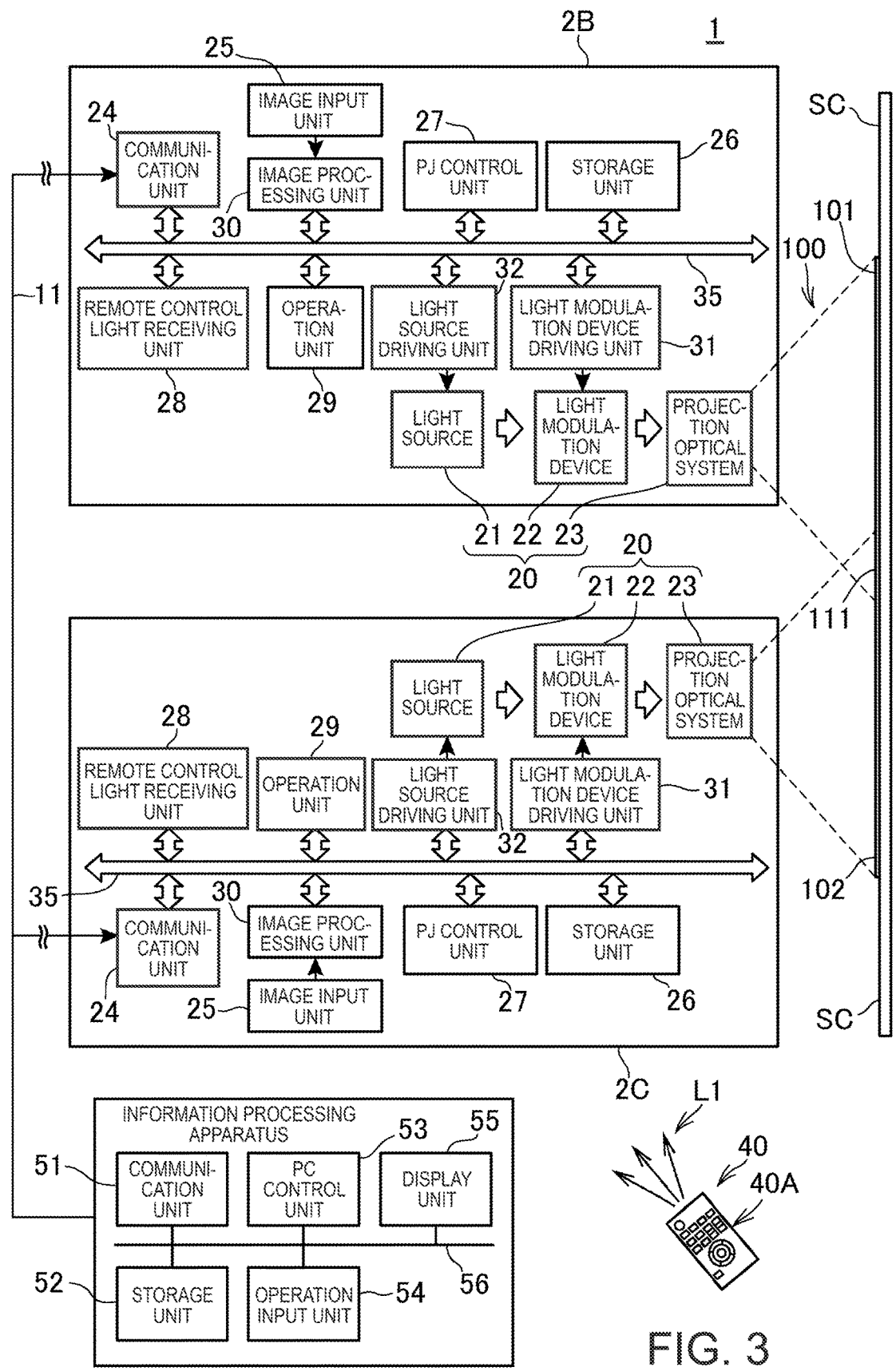
FIG. 3 is a block diagram illustrating projectors along with peripheral configurations.

FIG. 3 is a block diagram illustrating the projectors 2B and 2C in the room 10B along with peripheral configurations. The projectors 2 have the same configuration, and thus the projector 2B will be described, and repeated description of the other projectors 2 will be omitted.

The projector 2B includes a projection unit 20 which forms an optical image. The projection unit 20 includes alight source 21, a light modulation device 22, and a projection optical system 23. The light source 21 may be a light source formed of a xenon lamp, an ultra-high pressure mercury lamp, a light emitting diode (LED), or a laser light source. The light source 21 may be provided with a reflector which guides light emitted from the light source to the light modulation device 22. The light source 21 may be provided with a lens group and a polarization plate (not illustrated) for increasing optical characteristics of projection light, or a light control element (not illustrated) which reduces an amount of light emitted from the light source on a path reaching the light modulation device 22.

The light modulation device 22 includes three transmissive liquid crystal panels corresponding to three primary colors such as RGB, and modulates light transmitted through the liquid crystal panels so as to generate image light. Light from the light source 21 is split into three color light beams such as RGB, and the respective color light beams are incident to the corresponding liquid crystal panels. The color light beams having passed through the respective liquid crystal panels and thus having been modulated are combined with each other by a combination optical system such as a cross dichroic prism so as to be emitted to the projection optical system 23.

The projection optical system 23 includes a lens group which guides image light obtained through modulation in the light modulation device 22 toward the screen SC, and forms an image on the screen SC. The projection optical system 23 may include a zooming mechanism which performs enlargement and reduction, and adjustment of a focal point of a projection image on the screen SC, and a focus adjustment mechanism which adjusts a focus. In a case where the projector 2B is a short-focus type projector, a curved mirror (for example, a concave mirror or a convex mirror) which reflects image light toward the screen SC may be provided in the projection optical system 23.

The projector 2B includes a communication unit 24, an image input unit 25, a storage unit 26, a projector control unit 27 (hereinafter, referred to as a PJ control unit 27), a remote control light receiving unit 28, an operation unit 29, an image processing unit 30, a light modulation device driving unit 31, and a light source driving unit 32, in addition to the projection unit 20. These constituent elements are communicably connected to each other via a bus 35.

The communication unit 24 performs a communication process according to a predetermined communication protocol such as TCP/IP under the control of the PJ control unit 27. Consequently, the projector 2B can perform communication with the information processing apparatus 3 connected to the communication network 11. Specifically, the projector 2B may receive various data items such as image data and a control command transmitted from the information processing apparatus 3, and may transmit a response to the information processing apparatus 3. The image data may be either one of a moving image and a still image.

The image input unit 25 is an interface which can input image data (which may include audio data) from an external device without using the communication network 11. The external device is, for example, an image reproduction device such as a DVD player, a broadcast reception device such as a digital television tuner, or a video game machine. The projector 2B may read image data stored in the storage unit 26 of the projector 2B or an externally connected storage medium, and may project an image onto the screen SC on the basis of the image data.

The image input unit 25 is an interface conforming to, for example, IEEE1394 or USB. The image input unit 25 may be an interface such as MHL (registered trademark), HDMI (registered trademark), DisplayPort (registered trademark), or CoaXPress (registered trademark).

The storage unit 26 stores various data items and programs processed by the projector 2. The storage unit 26 also stores the IP address allocated to the projector 2B including the storage unit 26. The storage unit 26 is, for example, a random access memory (RAM), a register, a hard disk drive (HDD), or a solid state drive (SSD).

The PJ control unit 27 controls the respective units of the projector 2B by executing the programs stored in the storage unit 26. The PJ control unit 27 is formed of a processor performing a calculation process and peripheral circuits, and is formed of, specifically, a microcomputer, a system-on-a-chip (SOC), or a central processing unit (CPU).

The remote control light receiving unit 28 receives optical signals L1 (wireless signal) which is wirelessly transmitted from a remote controller 40 operated by a user. The optical signals L1 are, for example, infrared signals. The optical signals L1 may be signals in wavelength bands other than an infrared band. The remote control light receiving unit 28 outputs different control commands, that is, control commands (wireless control commands) corresponding to remote controller operations to the PJ control unit 27, in response to the received optical signals L1.

The remote controller 40 is provided with a plurality of operators 40A, and, if a user operates any one of the operators, the remote controller 40 transmits the optical signal L1 which differs for each operator 40A. The operators 40A are general operators provided in this kind of projector 2. For example, the operators 40A include a pause button for temporarily stopping a video, a zoom button for giving an instruction for digital zooming, a mute button (in a case where an image and a sound are being output, the sound also stops being output) for temporarily stopping image projection, and the like.

The operation unit 29 is provided with an operation panel which is operated by a user, and outputs an operation signal indicating the operation content to the PJ control unit 27 if the operation panel is operated. In the above-described way, the PJ control unit 27 may receive a user's instruction via the remote control light receiving unit 28 and the operation unit 29, and may control the respective units of the projector 2B in response to the user's instruction.

The image processing unit 30 performs image processing on image data which is input via the communication unit 24 or the image input unit 25. The image processing unit 30 performs a distortion correction process, a digital zooming process, a color tone correction process, a luminance correction process, and the like, under the control of the PJ control unit 27. The image processing unit 30 outputs an image signal indicating a grayscale of each pixel of the liquid crystal panels of the projection unit 20 for each of RGB on the basis of an image having undergone the image processing.

The light modulation device driving unit 31 sets a grayscale of each pixel by driving each liquid crystal panel of the light modulation device 22 on the basis of the image signal output from the image processing unit 30, and draws an image on the liquid crystal panel in the unit of a frame (screen). The light source driving unit 32 drives the light source 21 to be lighted, and controls an amount of light from the light source 21, under the control of the PJ control unit 27.

The PJ control unit 27 controls, for example, projection of an image onto the screen SC by controlling the respective units of the projector 2B. As illustrated in FIG. 2, in a case where the projectors 2B and 2C project the large projection image 100 through tiling projection in which projected images are arranged, the PJ control unit 27 causes the image processing unit 30 to perform image processing for adjusting the luminance of the overlapping region 111. Consequently, the overlapping region 111 is projected without discomfort in the same manner as the projection image 101 other than the overlapping region 111. As the image processing performed by the projector 2B, image processing in a well-known multi-projection system may be widely employed.

The information processing apparatus 3 performs a process of dividing an original image which is a base of the projection image 100 into partial images corresponding to the number of projectors 2 with respect to the projectors 2B and 2C. Through this process, image data of a partial image (projection image 101) projected by the projector 2B and image data of a partial image (projection image 102) projected by the projector 2C are generated. The information processing apparatus 3 distributes and supplies the image data of the plurality of generated partial images to the projectors 2B and 2C, and thus the projection image 100 is projected.

The information processing apparatus 3 includes a communication unit 51, a storage unit 52, a control unit 53 (hereinafter, referred to as a PC control unit 53), an operation input unit 54, and a display unit 55, and these constituent elements are communicably connected to each other via a bus 56 or the like.

The communication unit 51 has a configuration for communicating with projector 2 connected to the communication network 11, and performs a communication process based on a predetermined communication protocol such as TCP/IP under the control of the PC control unit 53. Consequently, the information processing apparatus 3 can perform communication with the projector 2 connected to the communication network 11. The information processing apparatus 3 can transmit image data, a control command, and the like to the projector 2, and can receive a response or the like transmitted from the projector 2, by using the communication unit 51.

The storage unit 52 stores various data items or programs processed by the PC control unit 53. The programs include a program causing the information processing apparatus 3 to be operated in a grouping mode which is an operation state regarding grouping.

The data stored in the storage unit 52 includes image data supplied to each projector 2, an IP address allocated to the information processing apparatus 3, and information such as a projector list PL which will be described later.

The PC control unit 53 controls the respective units of the information processing apparatus 3 by executing the programs stored in the storage unit 52. The PC control unit 53 is formed of, for example, a CPU, a read only memory (ROM), and a random access memory (RAM).

The operation input unit 54 is connected to an input device such as a keyboard or a mouse operated by a user, and outputs an operation signal indicating the operation content to the PC control unit 53 if the input device is operated. In the above-described way, the PC control unit 53 can perform various processes in response to a user's instruction.

The display unit 55 is provided with a display device such as a liquid crystal display, and displays various information pieces under the control of the PC control unit 53. The display device may be provided separately from the information processing apparatus 3, and may be integrally formed with the information processing apparatus 3.

Next, a description will be made of an operation of grouping the projectors 2. Hereinafter, a description will be made of a case of grouping the projectors 2B and 2C disposed in the room 10B into the same group. In this case, the user operates the information processing apparatus 3 so as to set an operation state of the information processing apparatus 3 to a grouping mode.

Figure 4:
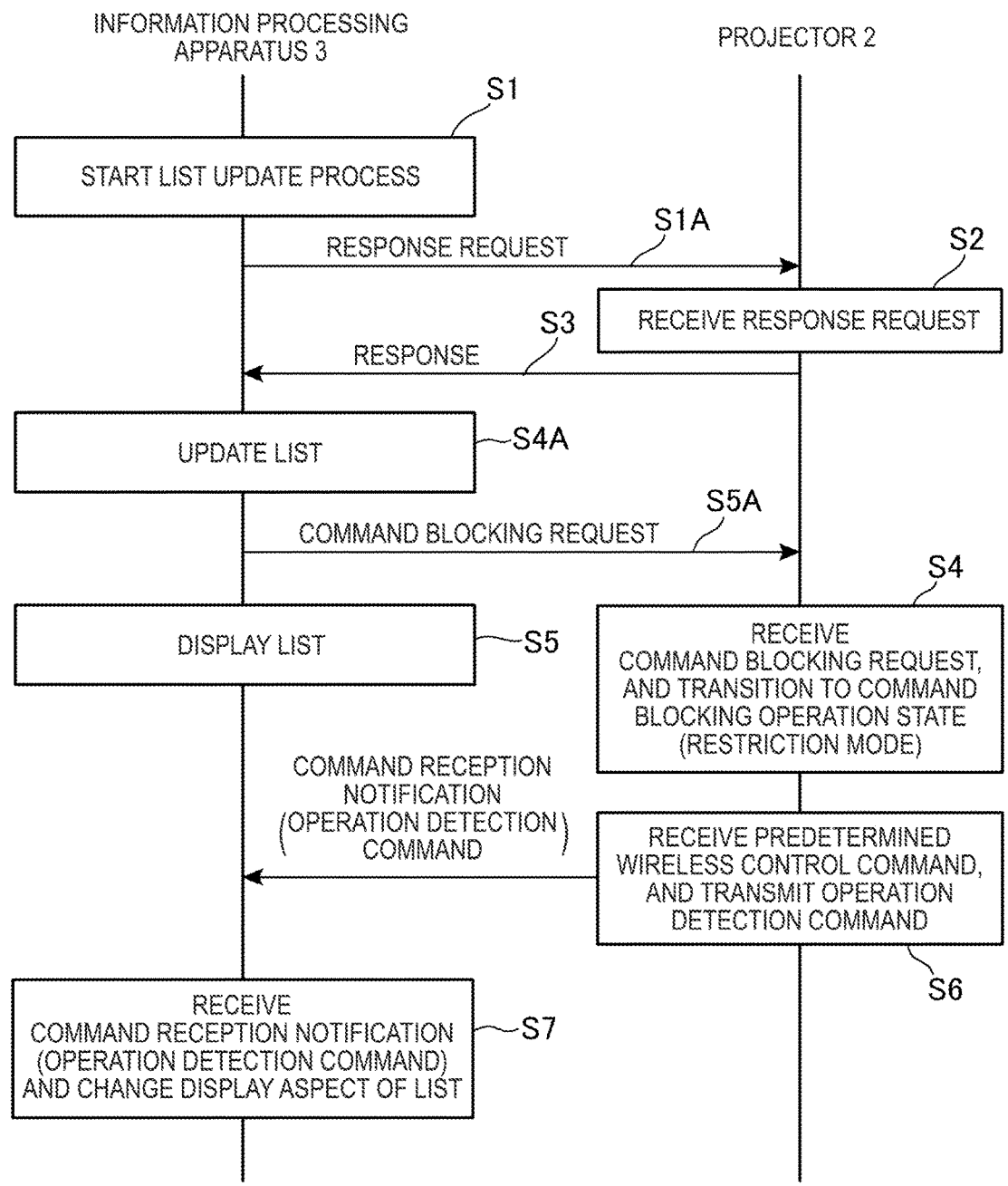
FIG. 4 is a diagram illustrating an operation example in a grouping mode.

FIG. 4 is a diagram illustrating an operation example in the grouping mode.

In the grouping mode, the PC control unit 53 of the information processing apparatus 3 starts a process (list update process) of updating the projector list PL (step S1). The projector list PL is data indicating a list of the projectors 2 included in the same network segment.

FIG. 5 is a diagram illustrating an example of the projector list PL. The projector list PL is a list of the projectors 2, and identification information (IP addresses in the present embodiment) for identifying the projectors 2 is described in the projector list PL. The projector list PL includes information indicating whether or not the projectors 2 are included in the same group among the projectors 2 in the list.

FIG. 5 illustrates a case where the projector list PL is displayed by the display unit 55, and IP addresses and checkboxes corresponding to the IP addresses are displayed. The checkboxes may be checked by the user operating the information processing apparatus 3, and indicate that a plurality of projectors 2 corresponding to a plurality of checked IP addresses are included in the same group.

Figure 6:
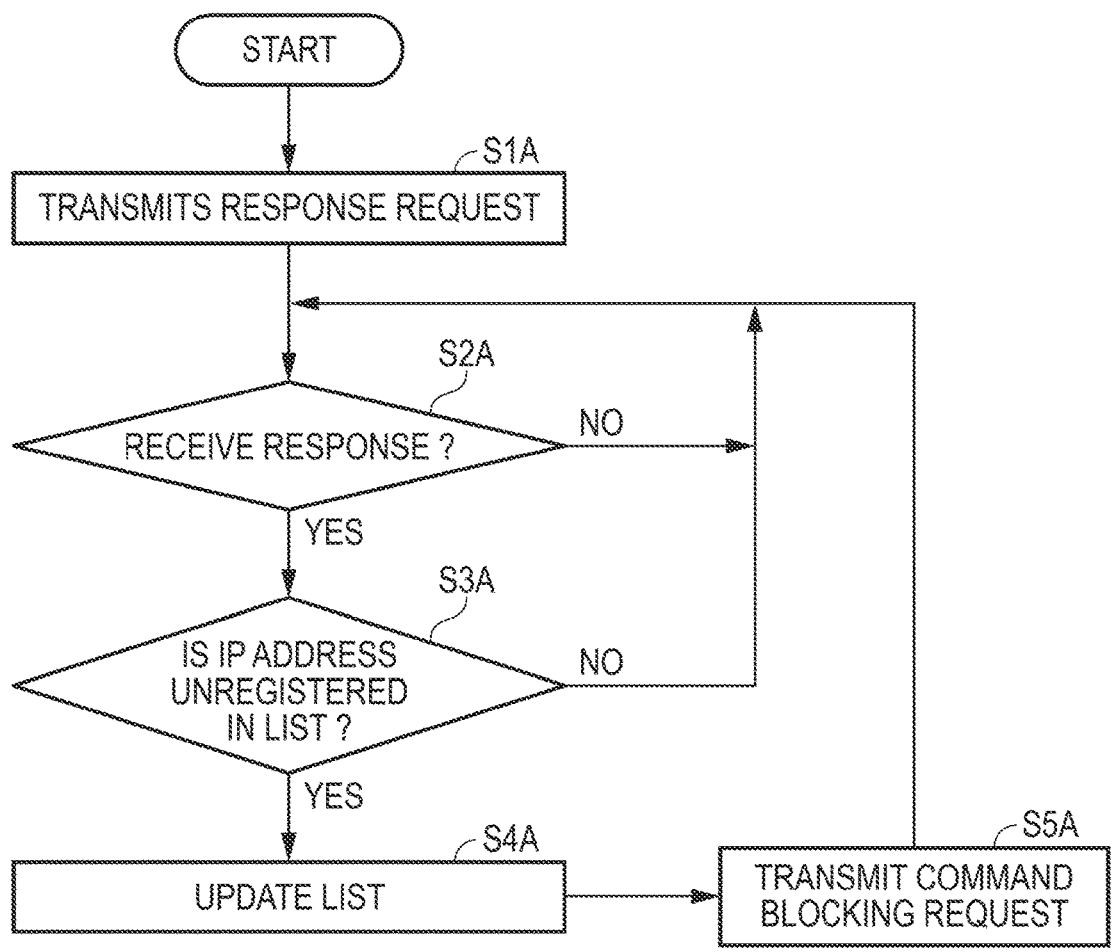
FIG. 6 is a flowchart illustrating a list update process.

FIG. 6 is a flowchart illustrating the list update process.

The PC control unit 53 broadcasts a preset response request via the communication unit 51 (step S1A). The response request is a predetermined signal for requesting a response from the projectors 2 which are nodes included in the same network segment (in this configuration, the communication network 11). More specifically, the PC control unit 53 broadcasts, as the response request, a PING command which is a search command for searching for the projectors 2 included in the same network segment. However, signals other than the PING command may be used.

As illustrated in FIG. 4, after the PC control unit 53 of the information processing apparatus 3 transmits the response request, if the PJ control unit 27 of the projector 2 receives the response request via the communication unit 24 (step S2), a response command as a response to the response request is transmitted to the information processing apparatus 3 (step S3). When the response is transmitted, the PJ control unit 27 also transmits information regarding the IP address stored in the storage unit 26 of the projector 2.

As illustrated in FIG. 6, after the response request is transmitted, the PC control unit 53 waits for a response to be received by the communication unit 51 (NO in step S2A). If the response (response command) is received (YES in step S2A), the PC control unit 53 determines whether or not the IP address received along with the response is unregistered in the projector list PL stored in the storage unit 52 (step S3A).

In a case where the IP address is unregistered in the projector list PL (YES in step S3A), the PC control unit 53 updates the projector list PL by registering the IP address in the projector list PL (step S4A). In a case where the projector list PL is not stored in the storage unit 52, the PC control unit 53 creates a new projector list PL including the received IP address. After the process in step S4A, the PC control unit 53 transmits a command blocking request via the communication unit 51 (step S5A).

In this case, the PC control unit 53 transmits the command blocking request to the newly registered IP address (to the projector 2) according to a communication protocol of TCP/IP.

If the command blocking request is received, the PJ control unit 27 of the projector 2 transitions to a command blocking operation state (hereinafter, referred to as a restriction mode) (step S4 in FIG. 4). In the restriction mode, the PJ control unit 27 invalidates some or all operations using the remote controller 40, and thus prohibits the projector 2 from being used as a single projector. In other words, the projector 2 can be used as only a multi-projector for multi-projection.

In a case where the IP address is not unregistered (that is, registered) in the projector list PL in the determination in step S3A illustrated in FIG. 6 (NO in step S3A), the PC control unit 53 waits for the next response to be received. Consequently, whenever there is a response from the projector 2 whose IP address is not registered, the unregistered IP address is sequentially registered in the projector list PL.

While waiting for a response to be received, the PC control unit 53 counts a waiting time, and finishes the list update process illustrated in FIG. 6 if the waiting time reaches a predefined finish determination time. Consequently, the PC control unit 53 updates the projector list PL in which all the projectors 2 included in the same network segment are registered.

If the list update process is finished, the PC control unit 53 causes the display unit 55 to display the content of the projector list PL (step S5 in FIG. 4). In this case, as exemplified in FIG. 5, the PC control unit 53 causes the display unit 55 to display the IP addresses in a list form, to display a checkbox corresponding to each IP address. The checkbox is displayed in an unchecked state.

Meanwhile, it is not understood in which room 10 each projector 2 is disposed on the basis of only the IP address. Thus, the user cannot easily group the projectors 2 for each room 10.

Therefore, in the present embodiment, the user performs a predetermined operation which is set in advance on the remote controller 40 in the room 10 in which the projector 2 to be grouped is disposed. The projector 2 receiving the predetermined operation transmits an operation detection command indicating that the predetermined operation has been detected via the communication unit 24 even in the command blocking operation state (step S6 in FIG. 4). The operation detection command is received by the information processing apparatus 3, and the PC control unit 53 of the information processing apparatus 3 performs a process of changing an appearance of the projector list PL regarding the projector 2 which has transmitted the operation detection command (step S7 in FIG. 4).

Here, the predetermined operation performed on the remote controller 40 by the user may be allocated to an operator which is scarcely used during multi-projection among a plurality of operators generally provided in this kind of remote controller. For example, the predetermined operation is an operation on a mute button. If an operator can be added, a dedicated operator corresponding to the predetermined operation may be added to the remote controller 40.

The predetermined operation detection command is operation detection information indicating that the predetermined operation has been detected, and is also a command reception notification for notifying the information processing apparatus 3 that the predetermined operation has been detected. The predetermined operation detection command is a block target command if the projector 2 is in a command blocking state.

Figure 7:
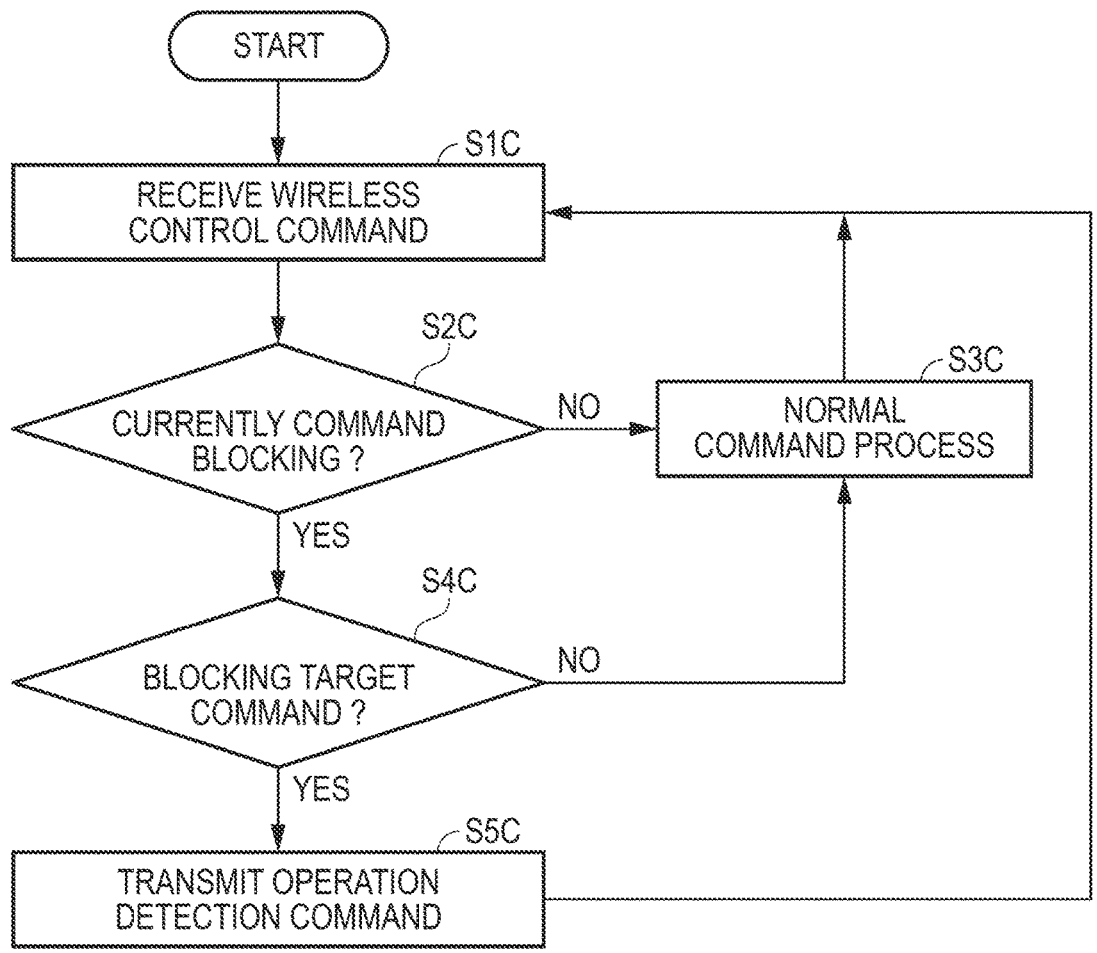
FIG. 7 is a flowchart illustrating an operation of a projector in a case where a wireless control command is received.

FIG. 7 is a flowchart illustrating an operation of the projector 2 in a case where a wireless control command is received.

If a wireless control command is received (step S1C), the PJ control unit 27 of the projector 2 determines whether or not the projector 2 is in a command blocking state (step S2C). In a case where the projector 2 is not in a command blocking state (NO in step S2C), the PJ control unit 27 performs a process corresponding to the wireless control command, that is, a normal command process (step S3C).

On the other hand, in a case where the projector 2 is in a command blocking state (YES in step S2C), the PJ control unit 27 determines whether or not the received wireless control command is a blocking target command (step S4C). If the wireless control command is not a blocking target command (NO in step S4C), the PJ control unit 27 performs a process corresponding to the wireless control command, that is, a normal command process (step S3C).

In contrast, in a case where the wireless control command is a blocking target command (YES in step S4C), the PJ control unit 27 transmits an operation detection command allocated to the blocking target command, that is, the above-described predetermined operation detection command to the information processing apparatus 3 via the communication unit 24 (step S5C), and the predetermined operation detection command is transmitted to the information processing apparatus according to the communication protocol of TCP/IP. Hereinafter, the predetermined operation detection command will be simply referred to as an "operation detection command".

As described above, if the command blocking request is received, the PJ control unit 27 of the projector 2 transitions to a command blocking operation state (step S4 in FIG. 4). Thus, if a predetermined wireless control command is received thereafter, the PJ control unit 27 transmits, to the information processing apparatus 3, an operation detection command as a command reception notification for a notification of the wireless control command having been received (step S6 in FIG. 4).

Therefore, if the user performs a predetermined operation on the remote controller 40 in the room 10B, operation detection commands are transmitted from the projectors 2B and 2C disposed in the room 10 to the information processing apparatus 3. In this case, the optical signal L1 from the remote controller 40 cannot pass through a wall and also has a restricted arrival distance, and thus is not received by the projectors 2 disposed in the other rooms 10A and 10C. Therefore, operation detection commands are not transmitted from the projectors 2 in other rooms 10A and 10C.

As illustrated in FIG. 4, if the operation detection command for a command reception notification is received, the PC control unit 53 of the information processing apparatus 3 changes an appearance of the projector list PL displayed by the display unit 55 (step S7).

Figure 8A:
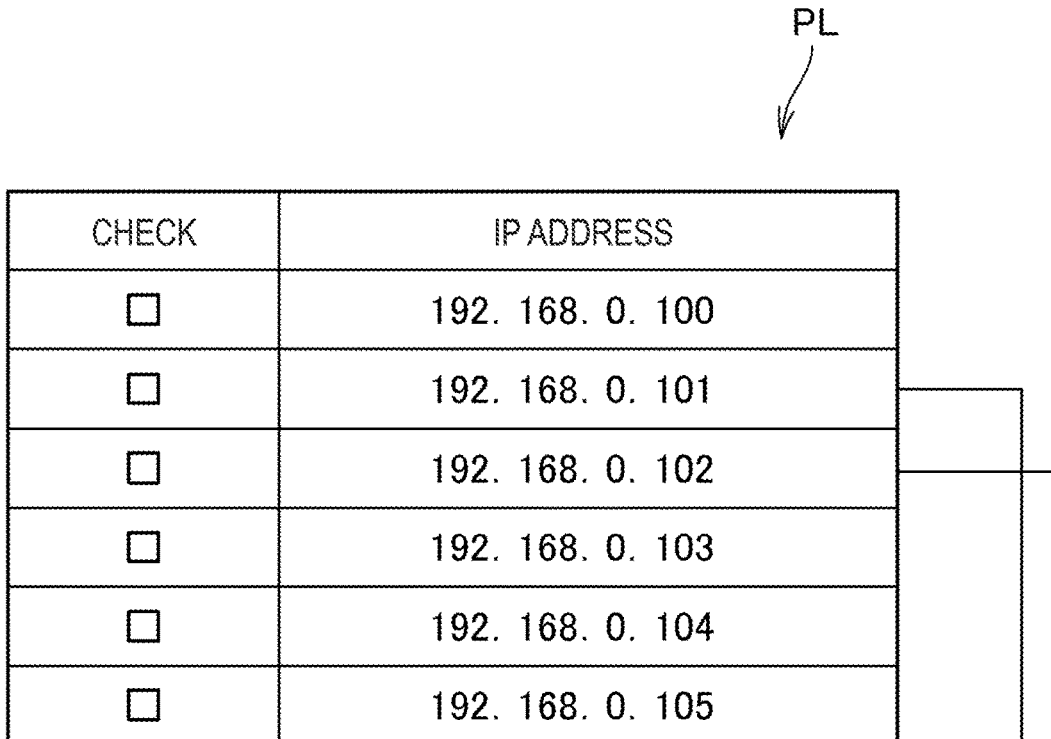
FIG. 8A is a diagram illustrating a projector list before an operation detection command is received.
Figure 8B:
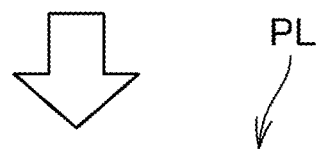
FIG. 8B is a diagram illustrating a projector list after the operation detection command is received.
Figure 8B:
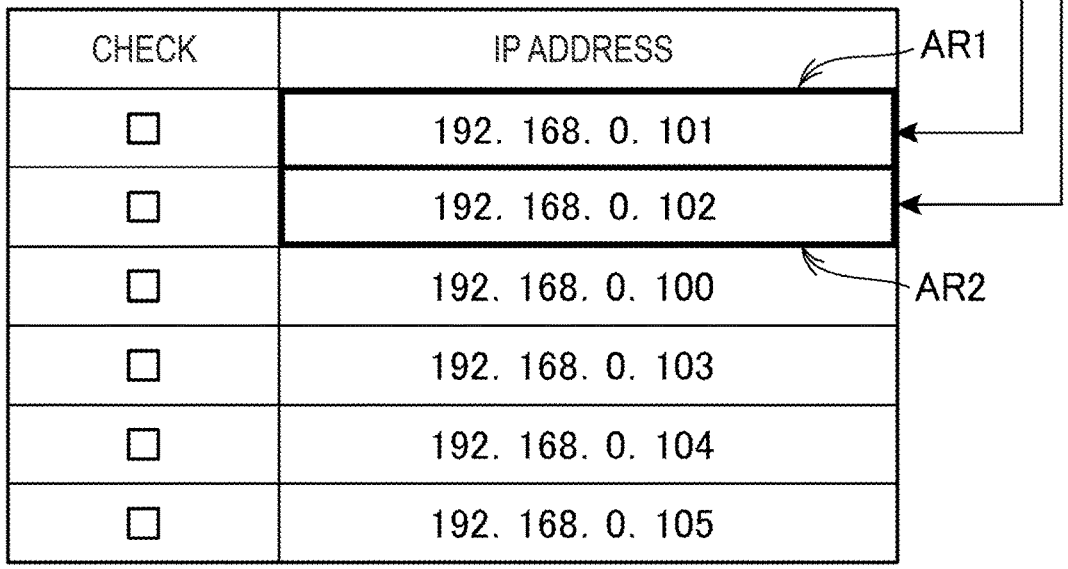

FIG. 8A is a diagram illustrating display of the projector list PL before the operation detection commands are received from the projectors 2B and 2C. FIG. 8B is a diagram illustrating display of the projector list PL after the operation detection commands are received from the projectors 2B and 2C.

As illustrated in FIGS. 8A and 8B, the PC control unit 53 changes an appearance of information (IP addresses) regarding the projectors 2B and 2C having transmitted the operation detection commands among information pieces of the projector list PL displayed by the display unit 55. In this case, the PC control unit 53 changes an appearance of the IP addresses of the projectors 2 having transmitted the operation detection commands to an appearance of being discriminable from the IP addresses of the other projectors 2.

More specifically, the PC control unit 53 performs a sorting process of moving an IP address of the projector 2 having transmitted the operation detection command to the uppermost position, and emphasis display on the IP address, whenever the operation detection command is received. Through the sorting process, the IP addresses ("192.168.0.101" and "192.168.0.102") of the projectors 2B and 2C are displayed in order from the uppermost position. Regarding the emphasis display, for example, a display process of hatching regions (regions AR1 and AR2 illustrated in FIG. 8B) of the IP addresses so as to improve identifiability of the regions, or a display process of giving a color which is different from the surroundings to numbers of the IP addressor making the numbers bold so as to improve identifiability.

In the above-described way, the IP addresses of the projectors 2 having transmitted the operation detection commands are displayed in an appearance of being visually recognized prior to the IP addresses of the other projectors 2. Consequently, the user can easily visually recognize the projectors 2B and 2C disposed in the room 10B. The user performs a predetermined determination operation by checking the checkboxes corresponding to the IP addresses of the projectors 2B and 2C, so as to group the projectors 2B and 2C.

An appearance in which an IP address of the projector 2 having transmitted the operation detection command is preferentially visually recognized is not limited to the above-described appearance, and may employ various well-known appearances.

As described above, in the display system 1 according to the present embodiment, the information processing apparatus 3 (control apparatus) includes the display unit 55, the communication unit 51 (first communication unit), and the PC control unit 53 (first control unit). The PC control unit 53 causes the display unit 55 to display information regarding the projector 2 (display apparatus) with which communication is performed via the communication unit 51. The projector 2 includes the communication unit 24 (second communication unit), the remote control light receiving unit 28 (operation reception unit) which receives an operation on the remote controller 40, and the PJ control unit 27 (second control unit). In a case where a predetermined operation is received by the remote control light receiving unit 28, the PJ control unit 27 transmits an operation detection command (operation detection information) indicating that the operation has been detected, via the communication unit 24. In a case where the operation detection command is received via the communication unit 51, the PC control unit 53 of the information processing apparatus 3 changes an appearance of an IP address (identification information) regarding the projector 2 having transmitted the operation detection command among information pieces displayed by the display unit 55.

According to the configuration of the display system 1 and the control method therefor, it is possible to easily specify the projector 2 having received a predetermined operation via the remote control light receiving unit 28. In other words, it is possible to easily specify the projector 2 within a range of receiving an operation on the remote controller 40. Therefore, it is possible to easily specify the projectors 2 disposed to be distributed to a plurality of rooms 10, for each room 10.

The PC control unit 53 of the information processing apparatus 3 transmits a PING command (search command) for searching for the projector 2 via the communication unit 24. In a case where the PING command is received via the communication unit 24, the PJ control unit 27 transmits a response command (response information) which is a response to the PING command via the communication unit 24. The PC control unit 53 receives the response (response command) via the communication unit 51, and displays an IP address which is information indicating the projector 2 having transmitted the response in a list form. Consequently, the IP address of the projector 2 having transmitted the response can be displayed by the display unit 55 in a list form.

In a case where an operation detection command is received via the communication unit 51, the PJ control unit 27 of the projector 2 changes an appearance of an IP address indicating the projector 2 having transmitted the operation detection command to an appearance of being discriminable from IP addresses indicating the remaining projectors 2. Consequently, it is possible to easily specify the IP address of the projector 2 having transmitted the operation detection command.

In this case, if the operation detection command is received, the PC control unit 53 of the information processing apparatus 3 causes the display unit 55 to display the IP address of the projector 2 having transmitted the operation detection command in an appearance of being visually recognized prior to the IP addresses of the remaining projectors 2. Consequently, the IP address of the projector 2 having transmitted the operation detection command is preferentially visually recognized and can thus be easily specified.

In the present embodiment, in a case where the operation detection command is received via the communication unit 51, the PC control unit 53 causes the display unit 55 to display the IP address of the projector 2 having transmitted the operation detection command at an upper position among the IP addresses displayed in a list form. Through this sorting process, the IP address of the projector 2 having transmitted the operation detection command can be preferentially visually recognized.

In a case where the operation detection command is received via the communication unit 51, the PC control unit 53 performs emphasis display on the IP address of the projector 2 having transmitted the operation detection command among the IP addresses displayed by the display unit 55 in a list form. Also through the emphasis display, the IP address of the projector 2 having transmitted the operation detection command can be preferentially visually recognized and can thus be more easily specified.

Figure 10A:
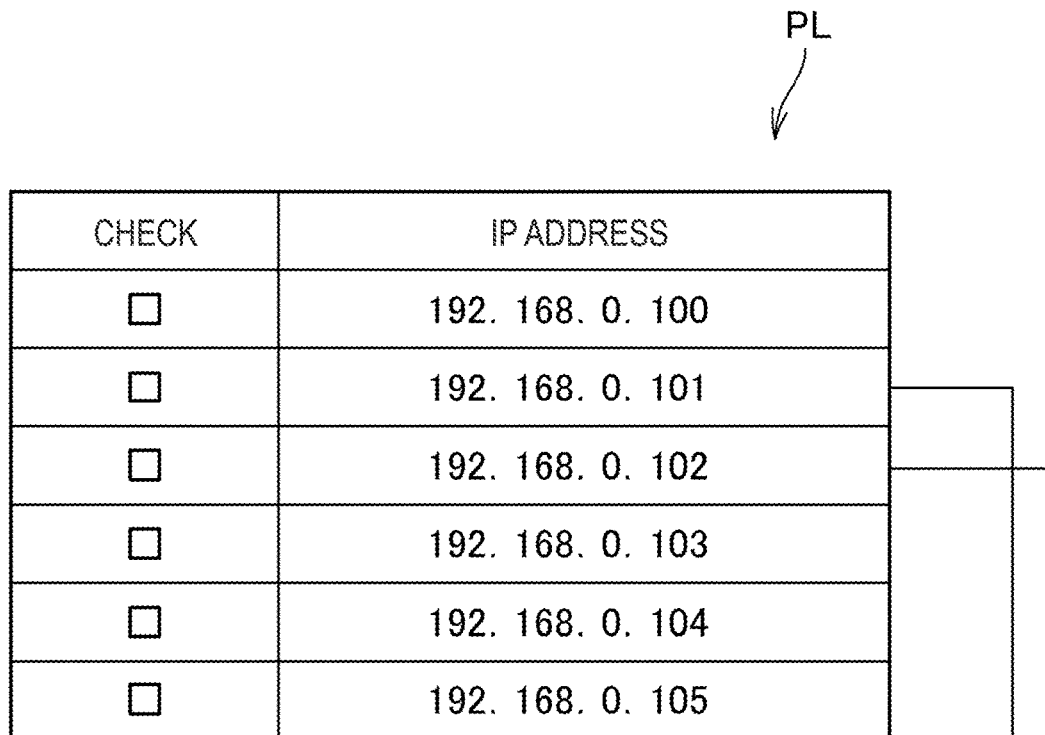
FIG. 10A is a diagram illustrating a projector list before an operation detection command is received.
Figure 10B:
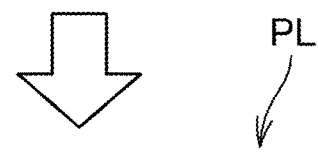
FIG. 10B is a diagram illustrating another display example of a projector list after the operation detection command is received.
Figure 10B:
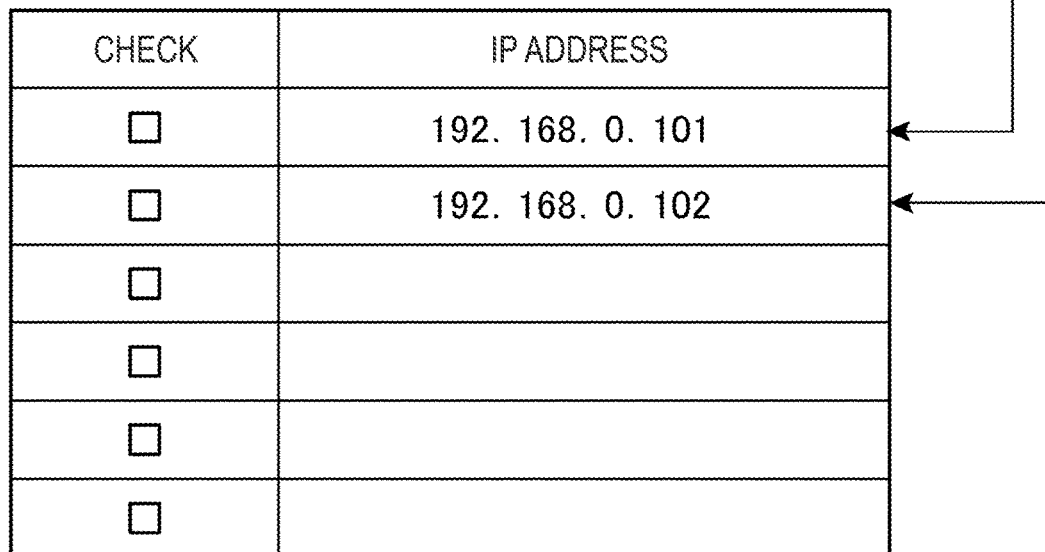

FIGS. 8A and 8B exemplify a case of performing both of the sorting process of displaying the IP address of the projector 2 having transmitted the operation detection command at an upper position and the emphasis display on the IP address, but this is only an example. FIGS. 9, 10(A) and 10(B) are diagrams illustrating another display example. FIG. 9 illustrates a case where IP addresses of the projectors 2 having transmitted operation detection commands are displayed in an emphasized manner. It is possible to easily specify the IP address of the projector 2 having transmitted the operation detection command on the basis of a display position by performing only emphasis display.

FIG. 10A is a diagram illustrating display of the projector list PL before operation detection commands are received from the projectors 2B and 2C. FIG. 10B is a diagram illustrating display of the projector list PL after the operation detection commands are received from the projectors 2B and 2C. As illustrated in FIGS. 10A and 10B, after the operation detection commands are received, display is performed so that information other than the IP addresses of the projectors 2 having transmitted the operation detection commands is removed. In this case, only the IP addresses of the projectors 2 having transmitted the operation detection commands are displayed, and thus it is possible to more easily specify the IP addresses of the projectors 2 having transmitted the operation detection commands.

The PJ control unit 27 (second control unit) of the projector 2 can perform a process corresponding to an operation received by the remote control light receiving unit 28 (operation reception unit). In a case where a PING command (search command) is received via the communication unit 24 (second communication unit), the PJ control unit 27 transitions to a restriction mode for restricting execution of a process corresponding to an operation received by the remote control light receiving unit 28. In a case where a predetermined operation is received by the remote control light receiving unit 28 in the restriction mode, the PJ control unit 27 transmits an operation detection command via the communication unit 24.

Since transition to the restriction mode occurs, some or all operations on the projector 2 using the remote controller 40 are invalidated, and thus the projector 2 cannot be used as a single projector or the like. In other words, the projector 2 can be made to be brought into a suitable operation state (in this configuration, multi-projector) which is realized through grouping.

The projector 2 (display apparatus) includes the projection unit 20 (display unit), the communication unit 24 performing communication with the information processing apparatus 3 (control apparatus), and the remote control light receiving unit 28 (operation reception unit) receiving an operation. The projector 2 further includes the PJ control unit 27 which transmits a response command which is a response to a PING command via the communication unit 24 in a case where the PING command (search command) transmitted from the information processing apparatus 3 is received via the communication unit 24. After the PING command is received via the communication unit 24, the PJ control unit 27 transmits an operation detection command via the communication unit 24 in a case where an operation is received by the remote control light receiving unit 28. Consequently, it is possible to easily specify the projector 2 on the information processing apparatus 3 side.

The PJ control unit 27 of the projector 2 can perform a process corresponding to an operation received by the remote control light receiving unit 28, and transitions to the restriction mode for restricting execution of a process corresponding to an operation received by the remote control light receiving unit 28 in a case where the search command is received. The PJ control unit 27 transmits an operation detection command via the communication unit 24 in a case where a predetermined operation is received by the remote control light receiving unit 28 in the restriction mode. Consequently, it is possible to easily specify the projector 2 on the information processing apparatus 3 side while restricting an operation on the projector 2.

The information processing apparatus 3 includes the display unit 55, the communication unit 51 performing communication with the projector 2, and the PC control unit 53 causing the display unit 55 to display information regarding the projector 2 with which communication is performed via the communication unit 51. The PC control unit 53 transmits a search command to the display unit 55 via the communication unit 51. In a case where a response command transmitted from the projector 2 having received the search command is received, the PC control unit 53 causes the display unit 55 to display information indicating the projector 2 having transmitted the response command in a list form. In a case where an operation detection command transmitted from the projector 2 is received, the PC control unit 53 changes an appearance of information regarding the projector 2 having transmitted the operation detection command among information pieces displayed by the display unit 55.

According to the invention, since an appearance of information regarding the projector 2 having transmitted the operation detection command among information pieces displayed by the display unit 55 is changed, it is possible to easily specify the projector 2 having transmitted the operation detection command.

Second Embodiment

A second embodiment is different from the first embodiment in that, among a plurality of projectors 2 connected to the communication network 11, the projector 2B performs a process regarding grouping in the information processing apparatus 3 of the first embodiment.

Figure 11:
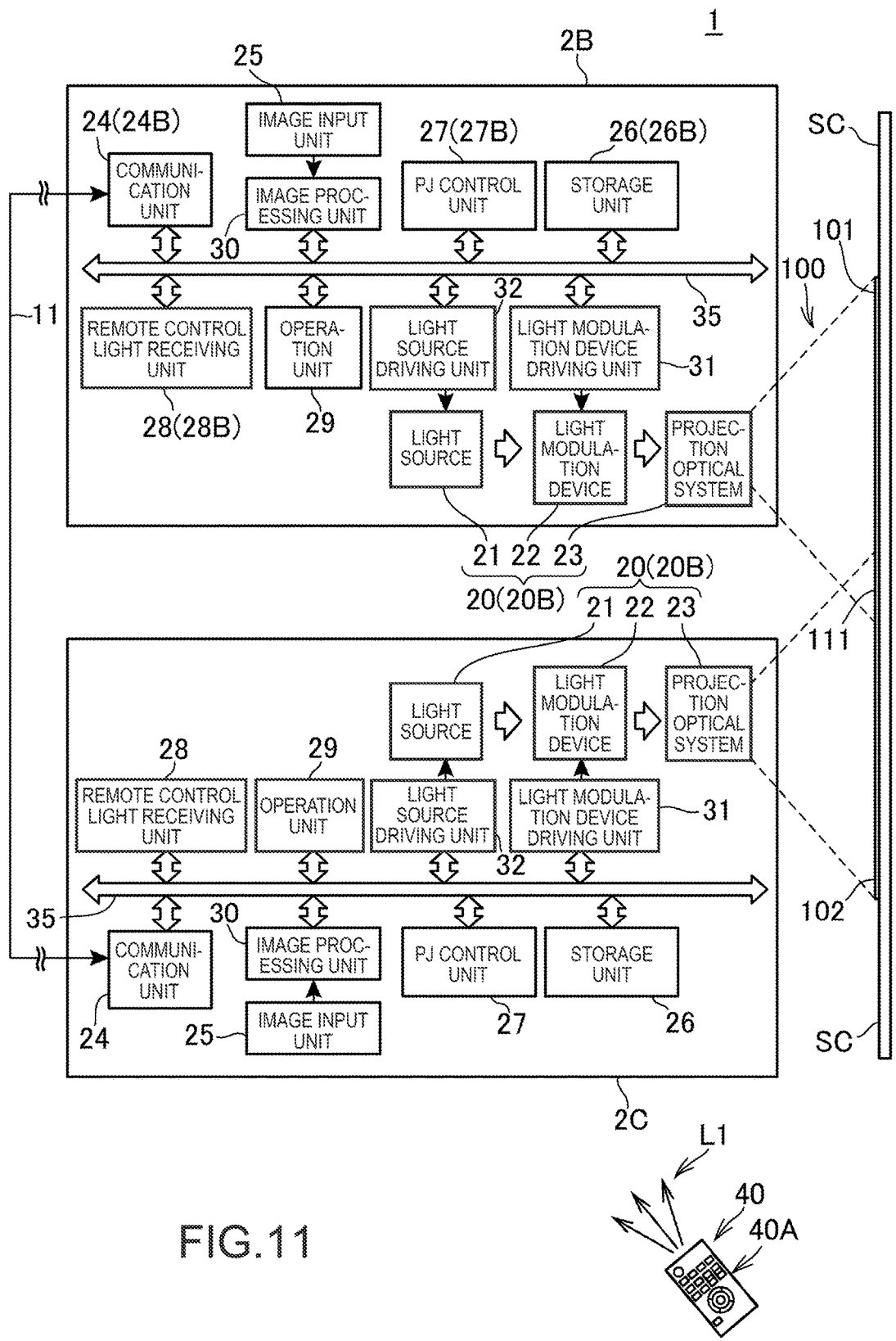
FIG. 11 is a block diagram illustrating projectors of a second embodiment along with peripheral configurations.

FIG. 11 is a block diagram illustrating the projectors 2B and 2C in the room 10B along with peripheral configurations. A program for executing a process regarding grouping is stored in the storage unit 26 of the projector 2B. By the PJ control unit 27 of the projector 2B executing the program, the projector 2B can perform a process regarding grouping of the projectors 2 including the projector 2B.

Hereinafter, the storage unit 26, the PJ control unit 27, the communication unit 24, the projection unit 20, and the remote control light receiving unit 28 of the projector 2B are referred to as a storage unit 26B, a PJ control unit 27B, a communication unit 24B, a projection unit 20B, and a remote control light receiving unit 28B so as to be differentiated from those of the other projectors 2.

Figure 12:
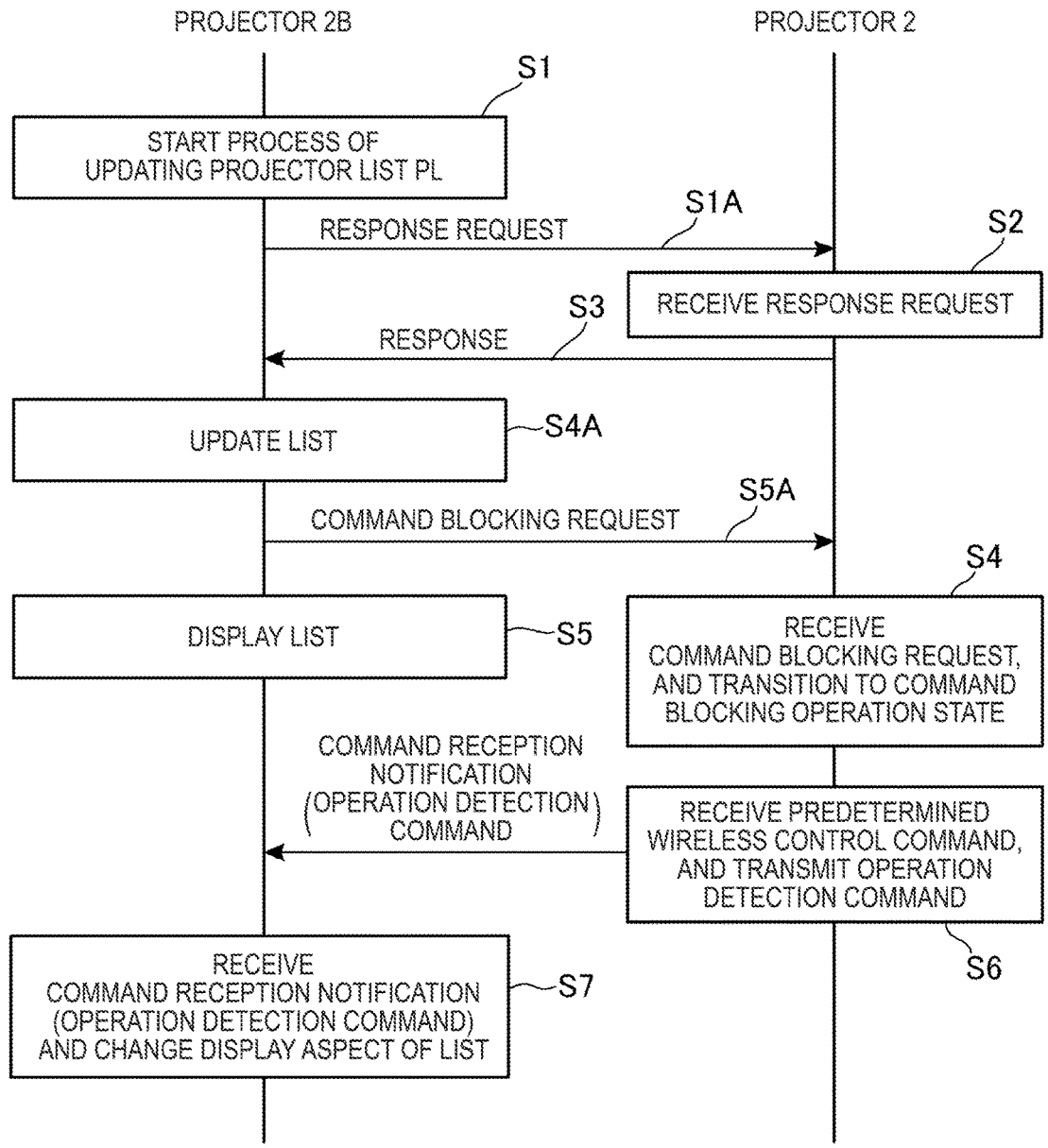
FIG. 12 is a diagram illustrating an operation example in a grouping mode.

If a predetermined instruction is input via the remote control light receiving unit 28 or the operation unit 29, the PJ control unit 27B of the projector 2B transitions to a grouping mode, and starts a process regarding grouping. A flow of the process in this case is illustrated in FIG. 12. In FIG. 12, the same portions as those in the first embodiment are given the same reference numerals. Here, different portions will be described in detail.

In step S1, the PJ control unit 27B starts a process of updating the projector list PL. A process performed in this case is the same as the projector update process illustrated in FIG. 6. However, the PJ control unit 27B may cause an IP address thereof to be included in the projector list PL so that the projection unit 20B displays a list of IP addresses of the projectors 2A to 2F in a display process in step S5 which will be described later. The projector list PL is stored in the storage unit 26B.

Here, in a case where an image supply apparatus such as the information processing apparatus 3, other than the projector 2 is connected to the communication network 11, the image supply apparatus (hereinafter, referred to as the information processing apparatus 3) may return a response to a PING command transmitted from the PJ control unit 27B. In this case, the PJ control unit 27B also registers an IP address of the information processing apparatus 3 in the projector list PL on the basis of the flow illustrated in FIG. 6. Thus, in step S5, the IP address "192.168.0.200" of the information processing apparatus 3 is also displayed.

In a case where the user performs a predetermined operation by using the remote controller 40 in the room 10B, a wireless control command corresponding to the predetermined operation is detected by the projectors 2B and 2C disposed in the room 10B via the remote control light receiving units 28B and 28. In this case, the projector 2C performs a process in step S6 illustrated in FIG. 12, that is, transmits an operation detection command to the projector 2B which is a transmission destination having transmitted the response in step S3. Therefore, the PJ control unit 27B of the projector 2B changes an appearance of the IP address of the projector 2C in a process in step S7 illustrated in FIG. 12.

The PJ control unit 27B of the projector 2B detecting the wireless control command also performs a process of changing an appearance of the IP address of the projector 2B in the process in step S7. Consequently, it is possible to easily specify the projectors 2B and 2C having received the predetermined operation by the remote control light receiving units 28B and 28.

As described above, in the display system 1 according to the second embodiment, the projector 2B (first display apparatus) includes the projection unit 20B (display unit), the communication unit 24B (first communication unit), and the PJ control unit 27B (first control unit). The PJ control unit 27B causes the projection unit 20B to display information regarding another projector 2 (second display apparatus) with which communication is performed via the communication unit 24B. Another projector 2 includes the remote control light receiving unit 28 (operation reception unit) receiving an operation on the remote controller 40, and the PJ control unit 27 (second control unit). In a case where the predetermined operation is received by the remote control light receiving unit 28, the PJ control unit 27 transmits an operation detection command indicating that the operation has been detected via the communication unit 24. In a case where the operation detection command is received via the communication unit 24B, the PJ control unit 27B of the projector 2B changes an appearance of an IP address (identification information) regarding the projector 2 having transmitted the operation detection command among information pieces displayed by the projection unit 20B.

According to the configuration of the display system 1 and the control method therefor, it is possible to easily specify the projector 2 within a range of receiving an operation on the remote controller 40 in the same manner as in the first embodiment. Therefore, it is possible to easily specify the projectors 2 disposed to be distributed to a plurality of rooms 10, for each room 10.

In a case where a predetermined operation is received by the remote control light receiving unit 28B of the projector 2B, the PJ control unit 27B of the projector 2B changes an appearance of an IP address (identification information) regarding the projector 2B among information pieces displayed by the projection unit 20B. Consequently, it is possible to easily specify the projector 2 (including the projector 2B) within a range of receiving an operation on the remote controller 40.

The projector 2B (display apparatus) includes the projection unit 20 (display unit), the communication unit 24 performing communication with the information processing apparatus 3 (control apparatus), and the remote control light receiving unit 28 (operation reception unit) receiving an operation. The projector 2 includes the PJ control unit 27 which transmits a response command which is a response to a PING command via the communication unit 24 in a case where the PING command transmitted from the information processing apparatus 3 is received via the communication unit 24. After the PING command is received via the communication unit 24, the PJ control unit 27 transmits an operation detection command indicating that an operation has been detected via the communication unit 24 in a case where the operation is received by the remote control light receiving unit 28. Consequently, it is possible to easily specify the projector 2 within a range of receiving an operation on the remote controller 40 on the information processing apparatus 3 side.

The above-described embodiments show a preferred embodiment of the invention, do not limit the invention, and may be variously modified within the scope without departing from the spirit of the invention. For example, in the above-described embodiments, a description has been made of a case where the projector 2 within a range of receiving an operation on the remote controller 40 is specified, but the projector 2 within a range of receiving operations other than an operation on the remote controller 40 may be specified. In this case, for example, in the room 10 in which the projector 2 to be group is disposed, a user performs a predetermined operation on an operation panel (operation unit 29) of the projector 2 disposed in the room 10. The projector 2 receiving the predetermined operation may transmit an operation detection command.

In the above-described embodiments, the configurations of the display system 1 illustrated in FIGS. 3 and 11, and the like indicate functional configurations, and thus a specific mounting aspect is not particularly limited. In the above-described embodiments, some or all of the functions realized in hardware may be realized in software. Other detailed configurations of the display system 1 may be changed as appropriate within the scope without departing from the spirit of the invention.

In the above-described embodiments, a description has been made of a case where the invention is applied to the display system 1 including a plurality of projectors 2, but the invention is not limited thereto. For example, the number of projectors 2 may be one. The invention may be applied to a display system including display apparatuses other than the projector. For example, the display apparatuses other than the projector may be liquid crystal displays.

What is claimed is:

1. A display system comprising:
a control apparatus; and
a display apparatus,
wherein the control apparatus includes
a display unit;
a first communication unit; and
a first control unit that causes the display unit to display a display apparatus list that includes identification information that identifies the display apparatus with which communication is performed via the first communication unit, the display apparatus list indicating whether the display apparatus and another display apparatus are included in a same group, wherein the display apparatus includes
- a second communication unit;
- an operation reception unit that receives a predetermined operation; and
- a second control unit that transmits operation detection information via the second communication unit to the first communication unit in response to the predetermined operation being received by the operation reception unit, the operation detection information indicating that the operation has been detected, and wherein, in response to the operation detection information being received via the first communication unit from the display apparatus, the first control unit changes an appearance of the identification information, which identifies the display apparatus in the display apparatus list displayed by the display unit, to be discriminable from the identification information that identifies the another display apparatus, the identification information identifying the display apparatus that transmitted the operation detection information among information pieces displayed by the display unit.

2. The display system according to claim 1,
wherein the first control unit transmits search information for searching for the display apparatus via the first communication unit,
wherein, in a case where the search information is received via the second communication unit, the second control unit transmits response information which is a response to the search information via the second communication unit, and
wherein the first control unit receives the response information via the first communication unit, and causes the display unit to display information indicating the display apparatus having transmitted the response information in a list form.

3. The display system according to claim 2,
wherein, in a case where the operation detection information is received via the first communication unit, the first control unit changes an appearance of the information indicating the display apparatus having transmitted the operation detection information to an appearance of being discriminable from information indicating other display apparatuses.

4. The display system according to claim 2,
wherein, in a case where the operation detection information is received via the first communication unit, the first control unit causes the display unit to display the information indicating the display apparatus having transmitted the operation detection information in an appearance of being visually recognized prior to information indicating other display apparatuses.

5. The display system according to claim 2,
wherein, in a case where the operation detection information is received via the first communication unit, the first control unit causes the display unit to display the information indicating the display apparatus having transmitted the operation detection information in an emphasized manner among information pieces displayed in a list form.

6. The display system according to claim 2,
wherein, in a case where the operation detection information is received via the first communication unit, the first control unit causes the display unit to display the information indicating the display apparatus having transmitted the operation detection information at an upper position among information pieces displayed in a list form.

7. The display system according to claim 2,
wherein, in a case where the operation detection information is received via the first communication unit, the first control unit deletes information indicating display apparatuses other than the display apparatus having transmitted the operation detection information among information pieces displayed by the display unit in a list form.

8. The display system according to claim 2,
wherein, in a case where the second control unit can perform a process corresponding to an operation received by the operation reception unit, and receives the search information via the second communication unit, the second control unit transitions to a restriction mode for restricting execution of a process corresponding to an operation received by the operation reception unit, and transmits the operation detection information via the second communication unit in a case where a predetermined operation is received by the operation reception unit in the restriction mode.

9. A display system comprising:
a first display apparatus; and
a second display apparatus,
wherein the first display apparatus includes
- a display unit;
- a first communication unit; and
- a first control unit that causes the display unit to display a display apparatus list that includes identification information that identifies the second display apparatus with which communication is performed via the first communication unit, the display apparatus list indicating whether the first display apparatus and the second display apparatus are included in a same group, wherein the second display apparatus includes
- a second communication unit;
- an operation reception unit that receives a predetermined operation; and
- a second control unit that transmits operation detection information via the second communication unit to the first communication unit in response to the predetermined operation being received by the operation reception unit, the operation detection information indicating that the operation has been detected, and wherein, in response to the operation detection information being received via the first communication unit from the second display apparatus, the first control unit changes an appearance of the identification information, which identifies the second display apparatus in the display apparatus list displayed by the display unit, to be discriminable from the identification information indicating the first display apparatus, where the identification information identifies the second display apparatus that transmitted the operation detection information among information pieces displayed by the display unit.

10. A control apparatus comprising:
a display unit;
a communication unit that performs communication with a display apparatus; and
a control unit that causes the display unit to display a display apparatus list that includes identification information that identifies the display apparatus with which communication is performed via the communication unit, the display apparatus list indicating whether the display apparatus and another display apparatus are included in a same group,
wherein, in a case where search information for searching for the display apparatus is transmitted via the communication unit, and response information which is a response to the search information, transmitted from the display apparatus having received the search information, is received via the communication unit, the control unit causes the display unit to display information indicating the display apparatus having transmitted the response information in a list form, and
wherein, in a case where operation detection information, which indicates that a predetermined operation has been detected by the display apparatus, is transmitted from the display apparatus and is received via the communication unit from the display apparatus, the control unit changes an appearance of the identification information, which identifies the display apparatus in the display apparatus list displayed by the display unit, to be discriminable from the identification information that indicates the another display apparatus, the identification information identifying the display apparatus that transmitted the operation detection information among information pieces displayed by the display unit.

11. A control method for a display system including a control apparatus provided with a display unit and a first communication unit, and a display apparatus provided with a second communication unit and an operation reception unit, the method comprising:
displaying, by the display unit, a display apparatus list that includes identification information that identifies the display apparatus with which communication is performed via the first communication unit, the display apparatus list indicating whether the display apparatus and another display apparatus are included in a same group;
transmitting operation detection information via the second communication unit in response to a predetermined operation being received by the operation reception unit, the operation detection information indicating that the operation has been detected; and
changing an appearance of the identification information, which identifies the display apparatus in the display apparatus list displayed by the display unit, to be discriminable from the identification information that identifies the another display apparatus, the identification information identifying the display apparatus that transmitted the operation detection information among information pieces displayed by the display unit, in response to the operation detection information being received via the first communication unit from the display apparatus.

12. A control method for a display system including a first display apparatus provided with a display unit and a first communication unit, and a second display apparatus provided with a second communication unit and an operation reception unit, the method comprising:
displaying, by the display unit, a display apparatus list that includes identification information that identifies the second display apparatus with which communication is performed via the first communication unit, the display apparatus list indicating whether the first display apparatus and the second display apparatus are included in a same group;
transmitting operation detection information via the second communication unit in response to a predetermined operation being received by the operation reception unit, the operation detection information indicating that an operation has been detected; and
changing an appearance of the identification information, which identifies the second display apparatus in the display apparatus list displayed by the display unit to be discriminable from the identification information that identifies the first display apparatus, the identification information identifying the second display apparatus that transmitted the operation detection information among information pieces displayed by the display unit, in response to the operation detection information being received via the first communication unit from the first display apparatus.

13. A control method for a control apparatus including a display unit, and a communication unit that performs communication with a display apparatus, the method comprising:
displaying, by the display unit, identification information that identifies the display apparatus with which communication is performed via the communication unit;
transmitting, by the communication unit, search information for searching for the display apparatus;
displaying, by the display unit, a display apparatus list that includes identification information that identifies the display apparatus that transmitted response information, in a case where the response information, which is a response to the search information, is transmitted from the display apparatus that received the search information and is received via the communication unit, the display apparatus list indicating whether the display apparatus and another display apparatus are included in a same group; and
changing an appearance of the identification information, which identifies the display apparatus in the display apparatus list displayed by the display unit, to be discriminable from the identification information that identifies the another display apparatus, the identification information identifying the display apparatus that transmitted operation detection information among information pieces displayed by the display unit, in response to the operation detection information, which indicates that a predetermined operation has been detected, is transmitted from the display apparatus and is received via the communication unit from the display apparatus.

14. The display system according claim 1,
wherein the second control unit transmits the operation detection information to the first communication unit in response to the operation reception unit receiving an optical signal from a remote controller.

* * * * *